United States Patent
Ayala et al.

(10) Patent No.: US 7,546,170 B2
(45) Date of Patent: Jun. 9, 2009

(54) EASILY TUNED AND ROBUST CONTROL ALGORITHM FOR SINGLE OR MULTIPLE VARIABLE SYSTEMS

(75) Inventors: Francisco J. Ayala, Dallas, TX (US); Carl H. Sturmer, Stephenville, TX (US)

(73) Assignee: Neuroblast, Inc., Dallas, TX (US)

( * ) Notice: Subject to any disclaimer, the term of this patent is extended or adjusted under 35 U.S.C. 154(b) by 349 days.

(21) Appl. No.: 11/619,119

(22) Filed: Jan. 2, 2007

(65) Prior Publication Data

US 2008/0159411 A1    Jul. 3, 2008

(51) Int. Cl.
*G05B 13/02*    (2006.01)
(52) U.S. Cl. .............................. 700/45; 700/37; 700/41
(58) Field of Classification Search ............... 700/31, 700/37, 40, 41, 44, 45, 48, 75; 706/21
See application file for complete search history.

(56) References Cited

U.S. PATENT DOCUMENTS

| | | | | |
|---|---|---|---|---|
| 4,577,270 A | * | 3/1986 | Sugano et al. ................ | 700/31 |
| 6,056,781 A | * | 5/2000 | Wassick et al. ............... | 703/12 |
| 6,347,018 B1 | * | 2/2002 | Kadlec et al. ............ | 360/77.08 |
| 6,377,013 B2 | * | 4/2002 | Suzuki .................... | 318/568.1 |
| 6,421,200 B2 | * | 7/2002 | Takaishi .................. | 360/78.09 |
| 6,662,059 B2 | * | 12/2003 | Ito et al. ....................... | 700/75 |
| 7,428,521 B2 | * | 9/2008 | Horvitz et al. ................ | 706/52 |
| 7,450,127 B2 | * | 11/2008 | Hong et al. ................. | 345/474 |
| 2003/0065409 A1 | * | 4/2003 | Raeth et al. ................... | 700/31 |
| 2007/0168056 A1 | * | 7/2007 | Shayegi et al. ............... | 700/48 |

FOREIGN PATENT DOCUMENTS

JP    63036309 A  *  2/1988

* cited by examiner

*Primary Examiner*—Crystal J Barnes-Bullock
(74) *Attorney, Agent, or Firm*—Carr LLP

(57) ABSTRACT

A controller and associated methods. A controller has an input for a controlled variable; a proportional term; an integral term; and a predictive term. The predictive term has an error-predictive subterm including at least a past value of an error; and a command-predictive subterm including at least one past value of a control command value; and an output. The controller can apply the predictive term and at least one of the proportional term and integral term to generate a command for the output. A method for controlling a process variable is also provided including applying a predictive term having an error-predictive subterm that includes at least a past value of an error and a command-predictive subterm that has at least a past value of a control command. The method further includes the step of generating a command based on the results of the applying the terms.

48 Claims, 10 Drawing Sheets

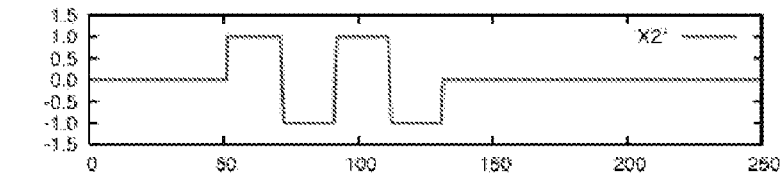
FIG. 13A
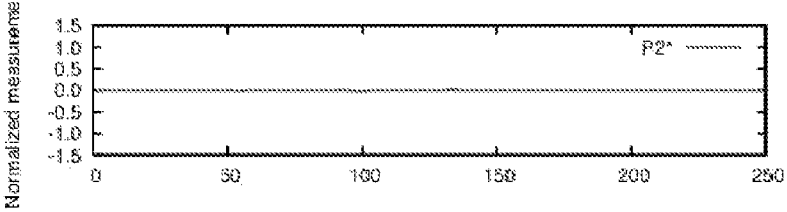
FIG. 13B
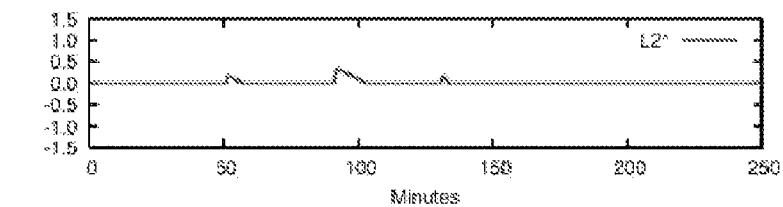
FIG. 13C
*NB-PIDs*
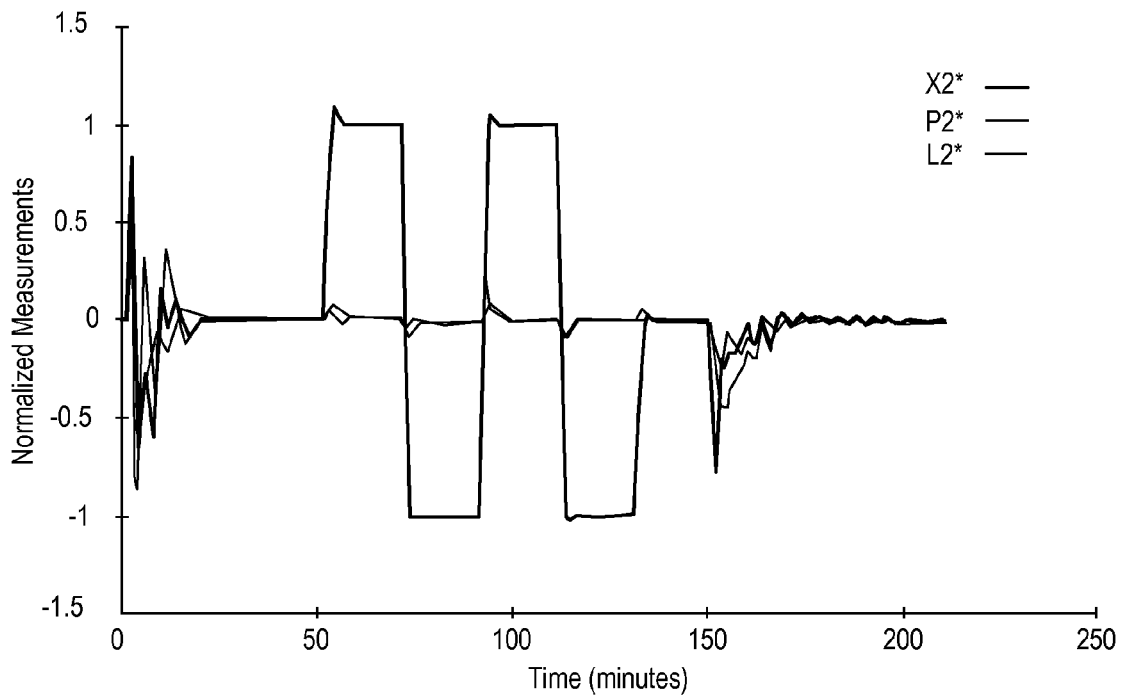
*PRIOR ART*
FIG. 14  *ANMC*

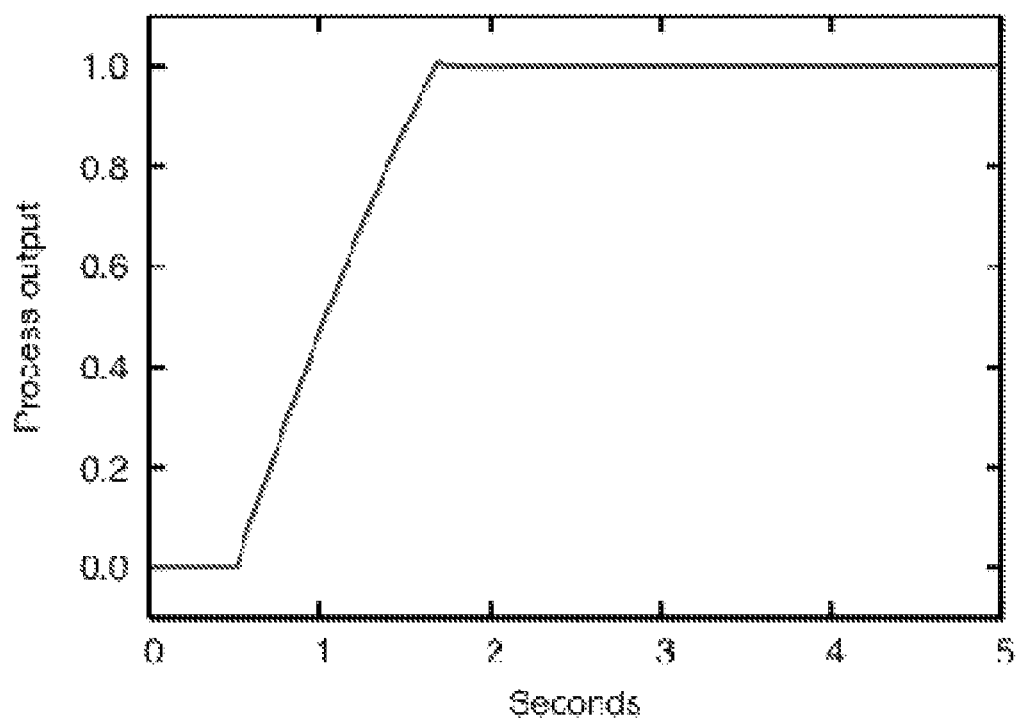
FIG. 15    *NB-PID - FOPDT*
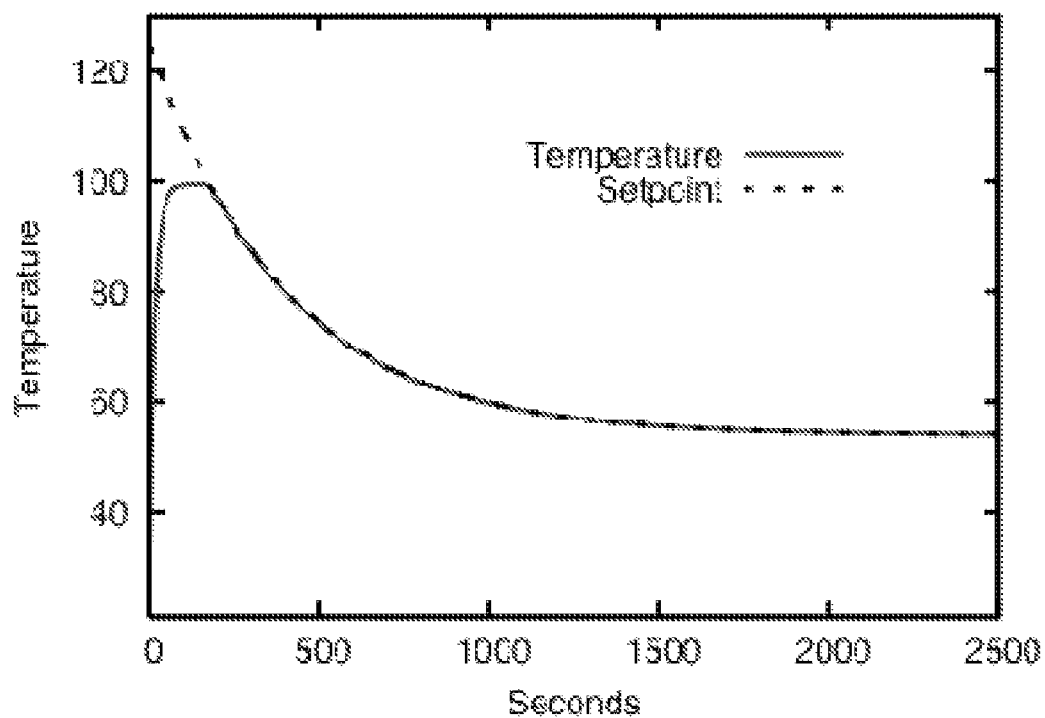
FIG. 16    *NB-PID - Non-Linear Batch Process*

EASILY TUNED AND ROBUST CONTROL ALGORITHM FOR SINGLE OR MULTIPLE VARIABLE SYSTEMS

TECHNICAL FIELD

The invention relates generally to control systems and, more particularly, to control systems which have proportional-integral-derivative control systems.

BACKGROUND

Automatic control systems are often implemented to control a process or system and thereby maintain a controlled variable (e.g. a temperature) at a desired value or setpoint. Example control systems include thermostats, cruise controls, robotic arms and autopilots. The most common type of controller is called the "PID" control which is named for the three main control operations performed by the control algorithm: proportional, integral, and derivative. The PID algorithm can be expressed as follows:

$$C = K_P * E + K_I * \int E + K_D * E' + b \qquad \text{EQ. 1}$$

In Equation 1, C is the controller output, E is the error (which indicates how far from the setpoint that the process currently is), and the parameters $K_P$, $K_I$, $K_D$ are the user-selected gains for the "P," "I," "D" terms, and b is a user-selected constant bias (which is often, though not always, set to zero).

The first term on the right-hand side of the equation is called the proportional term "P." Its value is a product of the error and the proportional gain $K_P$. The proportional operation implements the following control strategy: the further away the process is from its setpoint (and thus the larger the magnitude of the error), the larger the magnitude of the proportional term, and thus the greater its effect on the controller's effort to return the error to zero. The closer the process is to its setpoint, the lesser this term's effect.

The second term is the integral term "I." Its value is a product of the accumulated sum of all errors so far recorded times the integral gain $K_I$. The integral term implements the following strategy: whenever errors persist in time, their accumulating impact on the integral will have a steadily increasing effect on the controller output. The effect of the integral term will continue to grow until the output is strong enough to return the process to its setpoint. When the process has reached its setpoint, the integral term will become constant and cause no further change in the output. Moreover, the PID controller can be configured so that any non-zero integral term (when the setpoint has been reached) will continue to drive the output so that the controller counteracts the accumulated error with an offsetting "error" in the other direction. Thus, if a controller is controlling the mixture of two fluids, an error that has caused a low flow condition of one of the fluids can be offset by the integral term adding enough of the missing fluid to counteract the previous low flow condition.

The third term is called the derivative term "D." Its value is a product of the time derivative of the error signal and the derivative gain $K_D$. This control action allows the controller to anticipate the value of the error in the very near future and incorporate this foresight into its calculations. When the error is unchanging, this term becomes zero. However, when the error is changing rapidly, the derivative term is quite large and drives the controller output in the direction that counteracts the likely future error.

The final term is called the bias "b," and is set to whatever value the control command is supposed to have when the error is zero. Normally, the bias is designed to be zero. However, in some applications, it is desirable to have the flexibility to counteract biases (e.g., external influences that drive the error in a known manner).

In order to apply the PID algorithm to a given process, the control engineer typically finds workable values for the proportional, integral, and derivative gains $K_P$, $K_I$, and $K_D$, respectively. The PID algorithm is often expressed in different, yet algebraically identical forms.

The PID algorithm accounts for around ninety percent of all process control applications. It nevertheless suffers from several limitations. First, it can be very difficult and time consuming to find the right values for each of the gains (i.e. $K_P$, $K_I$, and $K_D$,), which are dynamically coupled. Tuning any one of them can upset the tuning of each of the others. Tuning all three together is thus a complex and often challenging problem. Configuring multiple PID controllers for simultaneous control of multiple-input, multiple-output (MIMO) processes is more challenging still. The dynamic interaction among different controlled variables in MIMO systems usually demands too much coordination among the controlling elements for PID controllers to work well in such parallel applications. MIMO problems often require more advanced methods.

More advanced control algorithms exist and are well-known. However, those methods are much more mathematically complex and require much more time and skill from the user to successfully implement. Therefore, a need exists for a simple process control algorithm, requiring very little set-up time and very little skill, yet capable of providing very robust control, and capable of easily controlling MIMO systems.

SUMMARY OF THE INVENTION

In one embodiment, a controller is provided which includes an input for a controlled variable; a proportional term; an integral term; a predictive term that has an error-predictive subterm that is a function of at least a past value of an error and a command-predictive subterm that is a function of at least a past value of a control command; and an output, the controller to apply the predictive term and at least one of the proportional term or integral term to generate a command for the output.

In another embodiment, a method for controlling a process variable is provided that includes applying an error-predictive subterm that is a function of at least a past value of an error and a command-predictive subterm that is a function of at least a past value of a control command, and at least one of a proportional term or an integral term, to controlling the controlled process variable; and generating a command based on the results of the applying the terms.

In another embodiment, a computer program product for controlling a system is provided that has a medium embodied thereon. The computer program product has computer code for applying a predictive term including an error-predictive subterm that includes at least a past value of an error and a command-predictive subterm that includes at least a past value of a command, and computer code for applying the predictive term and at least one of a proportional term or an integral term to controlling a controlled variable; and computer code for generating a control command based on the results of applying the terms.

In another embodiment, a control loop is provided comprising: a system with an associated controlled variable; a sensor adapted to sense the controlled variable; a controller including: an input in communication with the sensor to receive the controlled variable; a proportional term; an integral term; and a predictive term including an error-predictive subterm that includes at least a past value of an error and a command-predictive subterm that includes at least a past value of a command, and an output, the controller to apply the predictive term and at least one of the proportional term or integral term to generate a command for the output.

BRIEF DESCRIPTION OF THE DRAWINGS

For a more complete understanding of the present invention, and the advantages thereof, reference is now made to the following descriptions taken in conjunction with the accompanying drawings, in which:

FIGS. 13A, 13B and 13C, respectively, show the response of a controller in accordance with an embodiment of the present invention operating on a simulation of the forced circulation evaporator process of FIG. 12, on each of the three controlled variables, L2, P2 and X2;.

FIG. 14 shows the response of an Adaptive Neural Model Control (ANMC) controller operating on a simulation of the forced circulation evaporator process of FIG. 12;

FIG. 15 shows the response of a controller in accordance with an embodiment of the present invention operating on a simulated First Order Plus Dead Time (FOPDT) system with simulated unit change in setpoint at time t=0; and FIG. 16 shows the response of a controller in accordance with an embodiment of the present invention operating on a simulated nonlinear batch reactor system.

DETAILED DESCRIPTION

Figure 1:
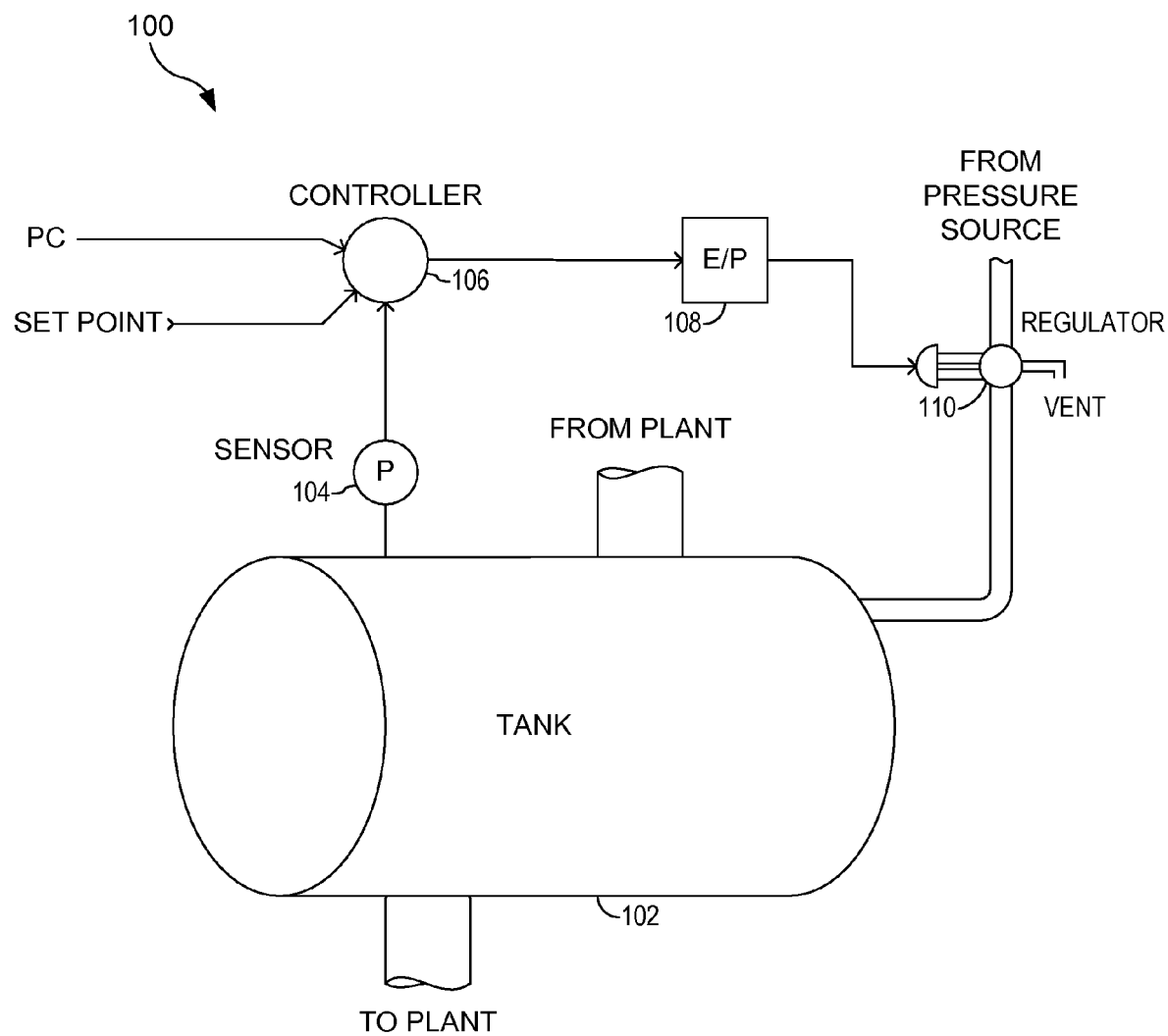
FIG. 1 depicts a control loop for controlling the pressure in a tank that is an element of an overall plant.

Referring to FIG. 1 of the drawings, the reference numeral 100 generally designates a system embodying features of the present invention. The system 100 includes a plant system (hereinafter "the plant") and a control loop. For instance, as shown by FIG. 1, the plant and loop can include between them a tank 102, a pressure sensor 104, a controller 106, a transducer 108, and a valve or regulator 110. Although an E/P (electrical to pressure) transducer has been depicted, it will be understood that an electrical to mechanical, electrical to magnetic, electrical to digital, or any other type of transducer may be used. While a pressure control loop and system 100 have been illustrated, many other types of systems 100 can be controlled as described herein. For instance, many other industrial, automotive, aerospace systems can be controlled. Moreover, the description herein is not intended to be constrained to mechanical, electrical, or other physical processes. For instance, a business process or system 100 could be the controlled system provided that the system 100 has a variable which is subject to change and which the user or owner of the system desires to maintain at some setpoint.

Still referring to FIG. 1, as changes occur in the system 100, it is known that the pressure sensed by the sensor 104 could vary from the setpoint in the absence of a control loop. For instance, surges of liquid into or out of the tank 102 can cause the pressure in the tank to vary. Other external influences may also cause the pressure to change. For instance, even if the tank were "locked up" with valves isolating the tank 102 from flows into or out of the tank, the ambient temperature could change causing the contents of the tank to warm or cool. In turn, the pressure in the tank 102 may change in a corresponding fashion.

To compensate for such variations from the setpoint, the control loop allows the system 100 to counteract the disturbance. In the pressure control loop of FIG. 1 this is accomplished by adding or subtracting a pressurizing gas to or from the tank 102 via the control valve 110. Generically speaking, the sensor 104 senses the controlled variable as it deviates from the setpoint and communicates a corresponding signal to the controller 106. The controller 106 compares the controlled variable to the setpoint and, using an algorithm implemented by a personal computer (PC) or other digital or analog computational device, generates a command to correct the deviation. The command is sent to the control element 110 which acts to restore the controlled variable to the setpoint. In conventional systems, the controller 106 often uses a PID control algorithm to derive the command from the error (i.e. the sensed variable minus the setpoint). Thus, the system 100 is said to be under feedback, or closed loop, control with respect to the controlled variable.

Instead of the controller using a conventional PID algorithm, the controller may use a new control method as described herein. For instance, in one embodiment, the following equations may be used to generate the control command:

$$e = E/K \qquad \text{EQ. 2}$$

$$I_t = I_{t-1} + e_t \text{ if } X_{t-1} \geq 0 \text{ and } X_{t-1} < 1 \text{ or } I_t = e_t \text{ otherwise} \qquad \text{EQ. 3}$$

$$X_t = 20 * e_t + 2 * I_t + (2/9) * D_{t-1} \qquad \text{EQ. 4}$$

$$D_t = 9 * e_t - 12 * e_{t-1} + 2 * X_t - X_{t-2} + 2 \qquad \text{EQ. 5}$$

$$C = C_{max} \text{ if } X_t \geq 1 \ C = C_{min} \text{ if } X_t \leq 0 \text{ or } C = C_{min} + X_t * (C_{max} - C_{min}) \text{ otherwise} \qquad \text{EQ. 6}$$

Of course, when the controller is first started, there will be no values known for past measurements, and thus there will be no values known for $X_{t-2}$, $X_{t-1}$, $D_{t-1}$, $I_{t-1}$, and $e_{t-1}$, that are used in Equations 3-5. Accordingly, at start-up, the controller initializes the value of these terms to zero, which initial value is replaced by actual values for these terms as they are established by successive measurements.

In Equations 2-6, E is the error (i.e., the difference between the desired setpoint of the process variable being controlled and its actual value as measured), K is a user-selectable scaling factor or gain, e is a scaled version of the error signal E, equal to E/K, I (along with any associated gain or coefficient) is an integral term, $X_t$ is an unscaled version of the command, $D_{t-1}$ (and its gain) is a time-delayed value of a term $D_t$, which has both an error-predictive subterm and a command-predictive subterm. C is the scaled version of the command subject to maximum and minimum values, depending upon the value of $X_t$. In Equations 2-6, t indicates the current sampling period, t-1 indicates the prior sampling period, t-2 indicates the sampling period two periods earlier, and so on. Although the term "sampling period" is applicable to digital embodiments, where the prior value is stored in a digital memory, it is to be understood that an analog version is also possible, with analog delay elements instead of digital sampling stored in memory. Also, it should be noted that the t-1, t-2 sampling periods represent consecutive ones of the values that are used in the equations, even if one or more intermediate measurements or values may have existed but were ignored. Similarly, the values at the t-1 and t-2 sampling periods can each represent average measurements taken over short periods of time, which may be useful in some cases to minimize undue fluctuation in the measurements of the values.

An inspection of Equations 2-6 reveals some of the features of the current embodiment. Equation 4 shows the respective gains of exact or approximate values of 20, 2, and 2/9 for the proportional, integral, and time-delayed predictive term $D_{t-1}$, respectively. However, by selecting different gains for the terms the user may tune the loop for a given application, by selecting other user-selectable proportional, integral, and time-delayed predictive term $D_{t-1}$ gains as may be appropriate in some circumstances. However, ordinarily, these values may be preset at the time of manufacture and need not be adjusted by the user.

With reference to Equation 2, by selecting the gain K, the user can adjust how the controller 106 scales the calculated error based upon the signal produced by the sensor 104 and the setpoint input to the controller 106. Equation 3 also shows that the controller 106 of the current embodiment may implement a form of anti-integral windup to prevent the integral term from growing beyond a user specified value. That is, after the integral term grows beyond that user specified value, the integral term will "reset" to the instantaneous value of the scaled error term e.

Equation 5 shows additional features of the current embodiment. More particularly, Equation 5 shows how the current value at t of the predictive term $D_t$ is determined. In particular, the predictive term $D_t$ may be expanded to include several sub-terms, an error-predictive subterm $9*e_t-12*e_{t-1}$, that samples the error e, and a command-predictive sub-term that includes at least one past value of the command, such as $2*X_t-X_{t-2}$. Regardless of the particular gains chosen for the subterms, or of the particular sampling periods chosen for the calculations, the predictive term $D_t$ allows the controller 106 of FIG. 1 to sense the direction and magnitude of any change occurring in the error. By factoring these considerations into Equation 5, the command $X_t$ determined by Equation 4 (and scaled command C generated in Equation 6) will have a predictive capacity to anticipate near term required changes in the command $X_t$ and scaled command C.

While the command-predictive subterm has some similarities to the error-predictive subterm previously discussed, it does differ advantageously in some ways. For instance, while the error-predictive subterm $9*e_t-12*e_{t-1}$ samples at least one past value of the error e, the command-predictive subterm samples at least one past value of the command X. Thus, the command-predictive subterm allows the controller 106 to anticipate (in a time weighted manner) the direction and magnitude of near term changes in the command X. Accordingly, the controller 106 can be said to anticipate changes in the command X.

The gains chosen for the error-predictive and command-predictive sub-terms of the predictive term $D_t$ also merit another comment. Namely, by doubling the weighting of the current command $X_t$ sample compared to the second to last previous sample $X_{t-2}$ and taking the difference, the command-predictive subterm approximately equals the change in the command over the period t-2 to t plus the current command. The result of this is that, when the trend of the command X is increasing, the command-predictive subterm predicts further required increases, thus permitting augmentation of the value of the command in a controlled manner (in the predicted direction).

The operation of the command-predictive subterm is to be distinguished from a conventional PID control. In a conventional PID control, the proportional, integral and derivative terms combine, in accordance with their user-selected gain values, to determine the control command. The respective "P," "I" and "D" values may or may not tend to offset one another at any given time. If the "P," "I" and "D" values offset one another at a given time, the control command will be driven to zero, even though there is a non-zero value of the error and even though the trend of the controller command value is increasing (or decreasing). By contrast, in an embodiment of the present invention, as embodied in Equations 2-6, the trend of the controller command value (increasing or decreasing) is also used as an input to the equation. See, Equation 5. This tends to bring the controlled process variable towards the setpoint more rapidly.

However, in the current embodiment, a time weighted trend of the command X (i.e. the output) can be used as an input. Thus, in the absence of an error, any non-zero command generated by the controller 106 will rapidly diminish to zero. Moreover, because the algorithm of the current embodiment also includes a proportional term, the controller 106 will tend to counteract any incipient deviation from the setpoint which the command-predictive subterm might attempt to cause. Further, because of the combined action of the command-predictive subterm and the proportional term, the controller 106 will rapidly drive the command in the direction to return the controlled variable of the system to the setpoint. As soon as the command-predictive subterm succeeds in bringing the controlled variable to the setpoint, the proportional term, as determined by its gain (combined with the derivative nature of the command-predictive subterm, as determined by its gain) will rapidly damp any overshoot that might otherwise develop.

One of the results of using the current embodiment is that the controller 106 can track setpoint changes with an exactitude not otherwise possible. Similarly, the controller can counteract large disturbances in the system while causing about the same (or usually much less) instantaneous overshoot. In addition, in those relatively severe situations where overshoot might persist, the controller 106 can rapidly drive the overshoot to zero and usually without any "ringing" (i.e. oscillations about the setpoint) in the system.

The error-predictive subterm and the command-predictive subterm in the embodiment discussed above can each be, respectively, functions of a past value of the error and a past value of the command X. In one embodiment, the error-predictive subterm and the command-predictive subterm can include two values of the error and command X taken at different times (for example, a current and a past value or two past values). Each of these two-value sets is used to essentially determine the characteristics of the line or curve corresponding to the data. Each of the error-predictive subterm and command-predictive subterm could, instead, be functions of more than two values taken at different times. Thus, for example, the error-predictive subterm and the command-predictive subterm could each be a function of three or more different values of the error taken at different times, which could then be averaged in some manner (simple, weighted, root-mean-squared, regression analysis, etc.) to determine a trend of a line or the function of a curve. The results derived from three or more values could then be used in a similar manner as two-value error-predictive and command-predictive subterms discussed with respect to the prior embodiment.

Figure 2:
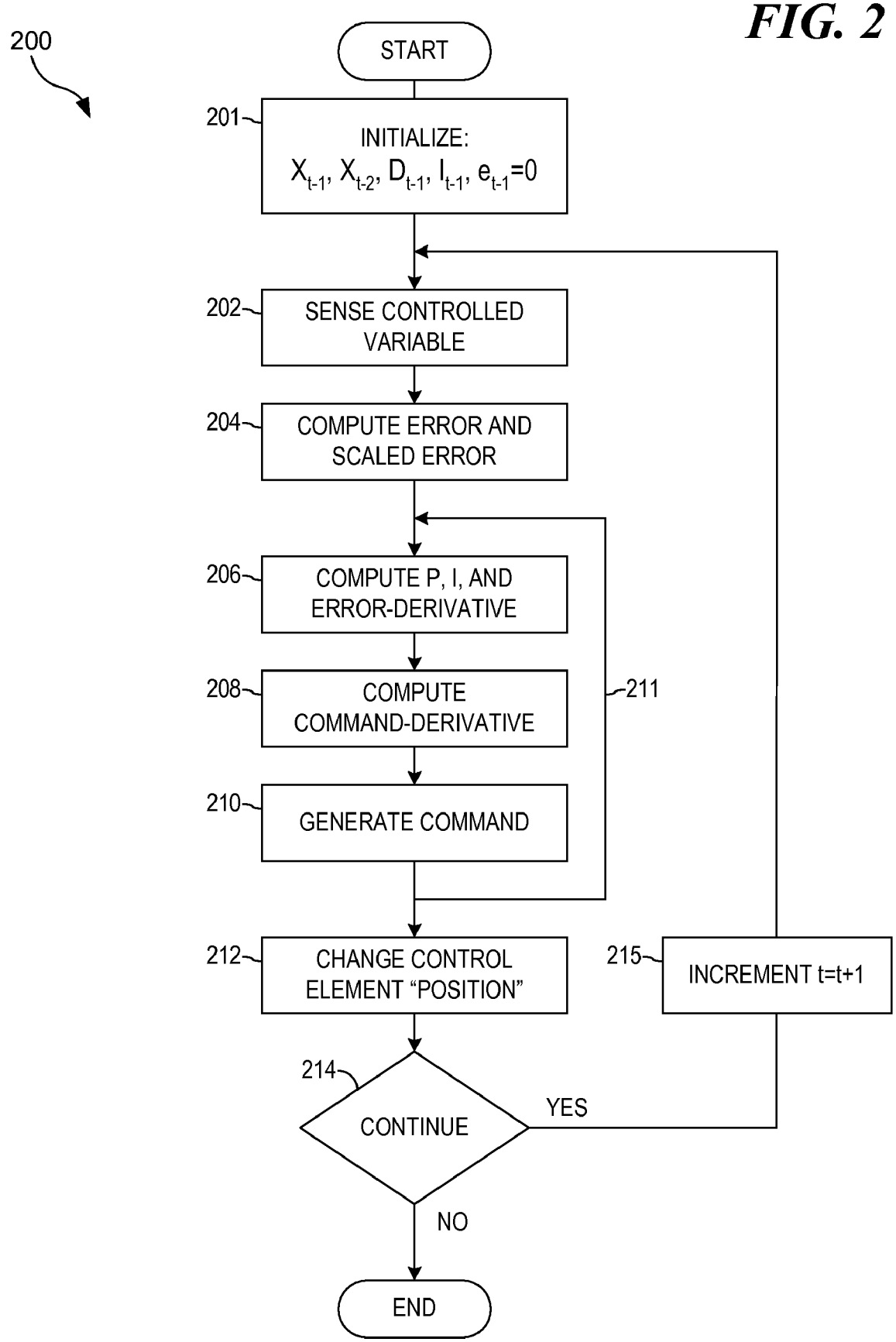
FIG. 2 is a flow chart illustrating operation of a control method in accordance with an embodiment of the present invention.

With reference now to FIG. 2, a method 200 is illustrated which the controller 106 can use. After start-up, initial values of $X_{t-2}$, $X_{t-1}$, $D_{t-1}$, $I_{t-1}$, and $e_{t-1}$, are initialized to zero in step 201. Then, the controlled variable (e.g. the pressure of tank 102) is sensed in operation 202. The error between the sensed variable and the setpoint can then be computed in operation 204. One or more of the P, I, and error-predictive subterm can then be applied to the error in operation 206. In step 208, a command-predictive subterm can also be computed. In step 210, a command can be generated by combining and applying the various terms as described, and can then be sent to a control element such as the valve 110 of FIG. 1. Feedback line 211 indicates that the command-predictive subterm computed in step 208 is based, in part, on a past value of the command.

In step 212, the control element can then respond to the command by, for instance, changing positions, speeds, etc. If it is desired to continue controlling the system, the method may begin over as indicated by decision 214, and the time t will be incremented by one in step 215. In the alternative, the controller may end the method 200 if no further control activity is desired. In most cases, the control activity will continue.

The embodiments described herein provide superior control performance with various combinations of proportional, integral, and derivative control action that are incredibly robust. Furthermore, the embodiments described herein are simple to use compared to standard PI/PID controllers because, in part, the systems can be tuned with one single gain. Furthermore, multiple controllers can be combined to control multivariable processes often in just a few rounds of manual tuning of the overall system, thus requiring dramatically less effort, expertise, and expense than previously possible.

FIGS. 3-16 and Examples 1-6 are several difficult-to-tune systems that were simulated, using the inventive control methods described herein to control these simulated systems, as well as simulated operation using prior art control systems. The results of the simulations are illustrated in the following illustrative examples.

EXAMPLE 1

Biotechnology System—Continuous Fermentation Reactor

FIGS. 3-8 show graphs of the operation of a biotechnology system with different control methods. A biotechnology system was chosen because biotechnological processes are notoriously complex, and control engineers must often resort to advanced methods in order to avoid wasted resources and poor yields. More specifically, inside a continuous fermentation reactor, millions of microorganisms consume a nutrient substrate and metabolize it into a commercially valuable product. The controller's objective is to maintain the substrate concentration at some desired optimal level by adjusting the flow rate of growth media through the vessel (i.e. the reactor dilution rate). The reaction kinetics exhibit substrate inhibition as well as product inhibition, and the dynamics are therefore complex and very nonlinear. The simulation of the bioreactor demonstrated that a controller constructed as described herein outperformed a conventional PI (proportional-integral only) controller as well as a controller designed using much more advanced methods.

The following equations describe the simulated continuous fermentation reaction.

$$\frac{dX}{dt} = -DX + \mu X$$

$$\frac{dS}{dt} = D(S_j - S) - \frac{\mu X}{Y_{X/S}}$$

$$\frac{dP}{dt} = -DP + (\alpha\mu + \beta)X$$

$$\mu = \frac{S\mu_m\left(1 - \frac{P}{P_m}\right)}{K_m + S + \frac{S^2}{K_i}}.$$

Where X, S, P, and $S_f$ are the cell, substrate, product, and feed concentrations, respectively, D is the dilution rate, $\mu$ is the specific growth rate, $\mu_m$ is the maximum specific growth rate, and the remaining variables are yield parameters and constants.

Figure 3:
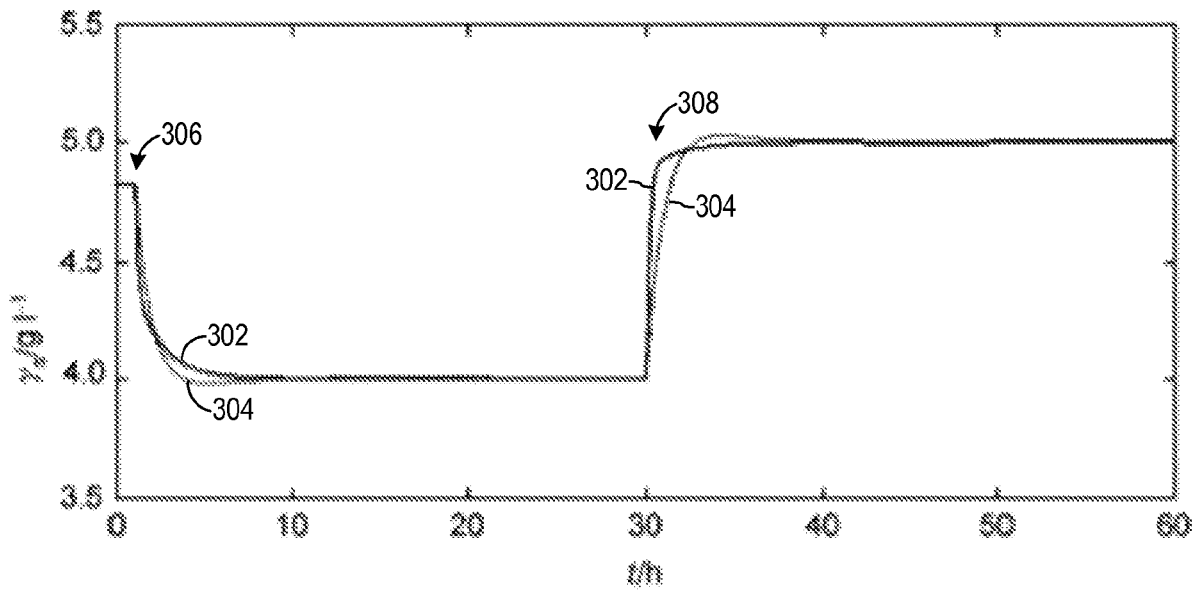
FIG. 3 is a graph showing the response characteristics of a PI controller and a sliding mode controller to two simulated setpoint step changes in the controlled process variable.

FIG. 3 is a graph showing the performance of a PI controller 304, and a controller developed by Tham et al. using a technique called sliding mode control (SMC), which involves Lyapunov functions, manifold sliding surfaces, adaptive switching gains, and other kinds of intricate math, was also simulated, controller 302. See, Tham, H. J., Ramachandran, K. B., and Hussein, M. A., *Sliding Mode Control For A Continuous Bioreactor*, Chem. Biochem. Eng. Q., Vol. 17, no. 4 (2003), pp. 267-275. FIG. 3 (as reproduced from FIG. 8 of Tham) shows that the performance of the SMC controller 302 is improved compared to a typical PI controller 304 through a series of setpoint changes 306 and 308.

Figure 4:
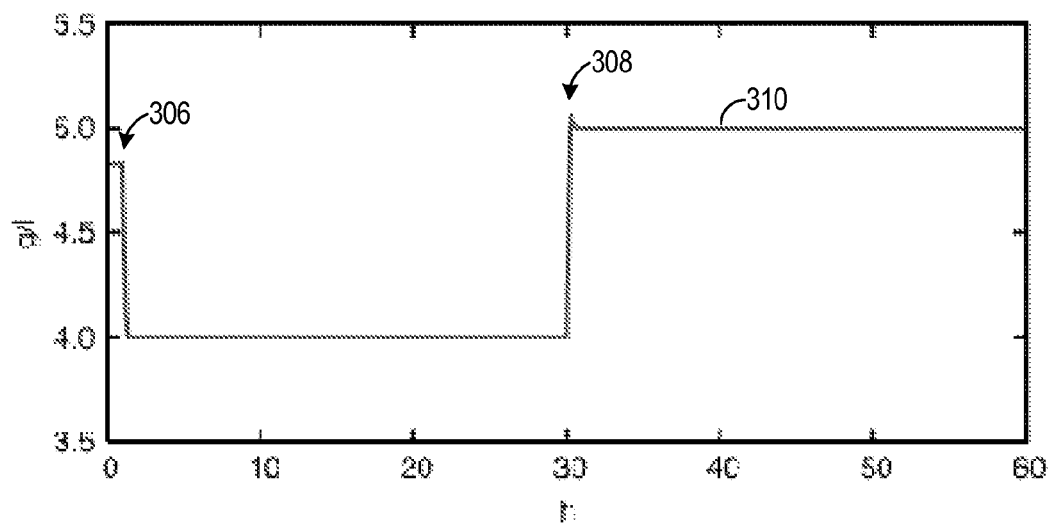
FIG. 4 is a graph showing the response characteristics of a controller in accordance with an embodiment of the present invention to two simulated setpoint step changes in the controlled process variable.

In contrast, FIG. 4 illustrates the superior response over the PI controller 304 and even over the Tham controller 302, of a controller 310 using the algorithm of Equations 2-6. More particularly, the simulated controller 310 accurately tracked the step changes 306 and 308 in the setpoint with comparatively negligible lag and overshoot. Moreover, the simulated controller 310 was tuned very easily, since only adjustment of the single parameter K was required.

Figure 5:
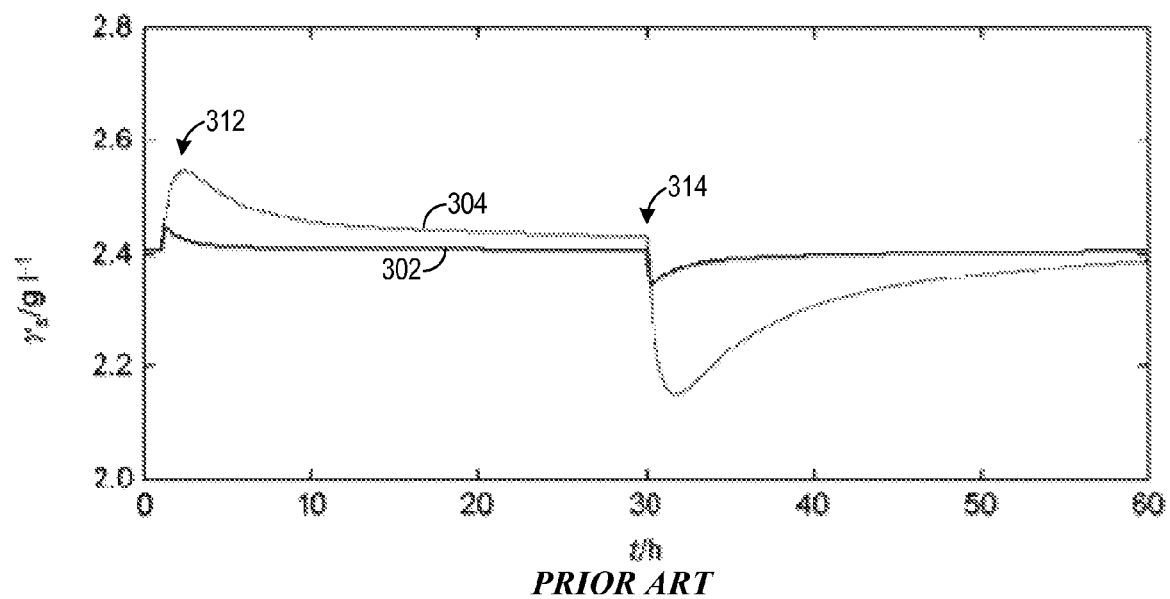
FIG. 5 is a graph showing the response characteristics of a PI controller and a sliding mode controller to two simulated disturbances in one of the process variables.
Figure 6:
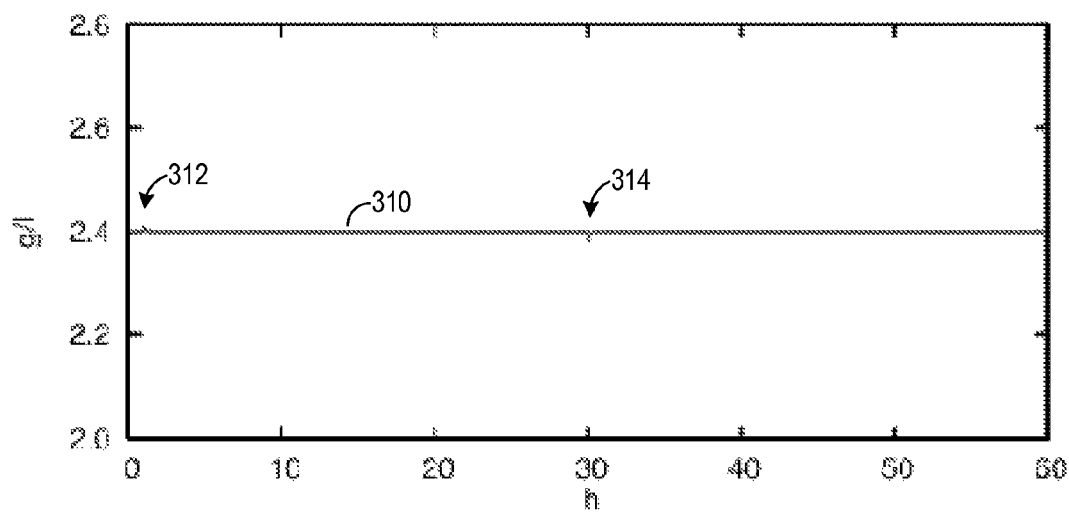
FIG. 6 is a graph showing the response characteristics of a controller in accordance with an embodiment of the present invention to two simulated disturbances in one of the process variables.
Figure 7:
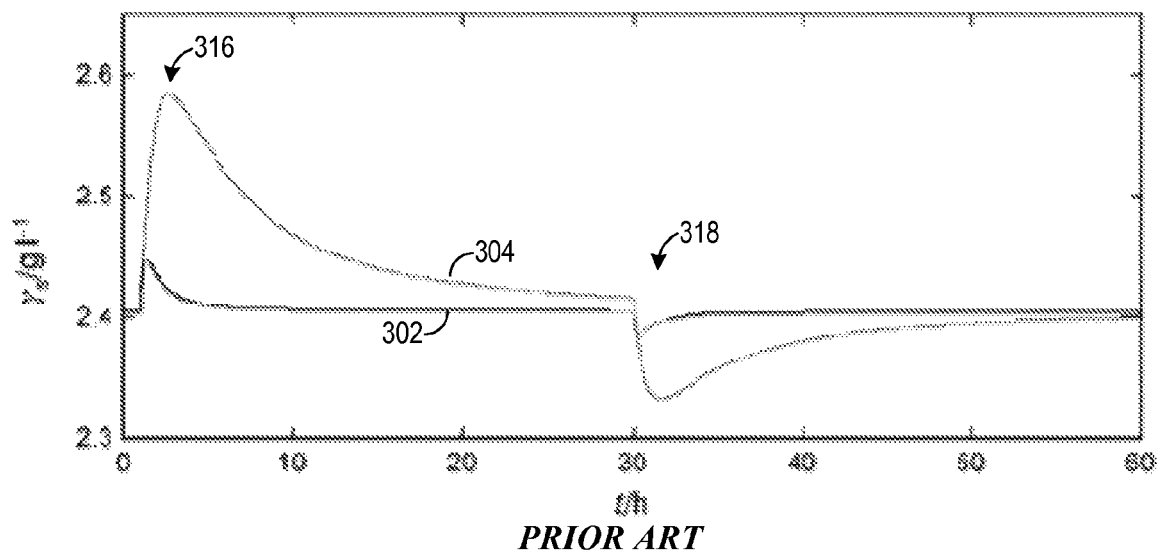
FIG. 7 is a graph showing the response characteristics of a PI controller and a sliding mode controller to two simulated disturbances in one of the process variables.
Figure 8:
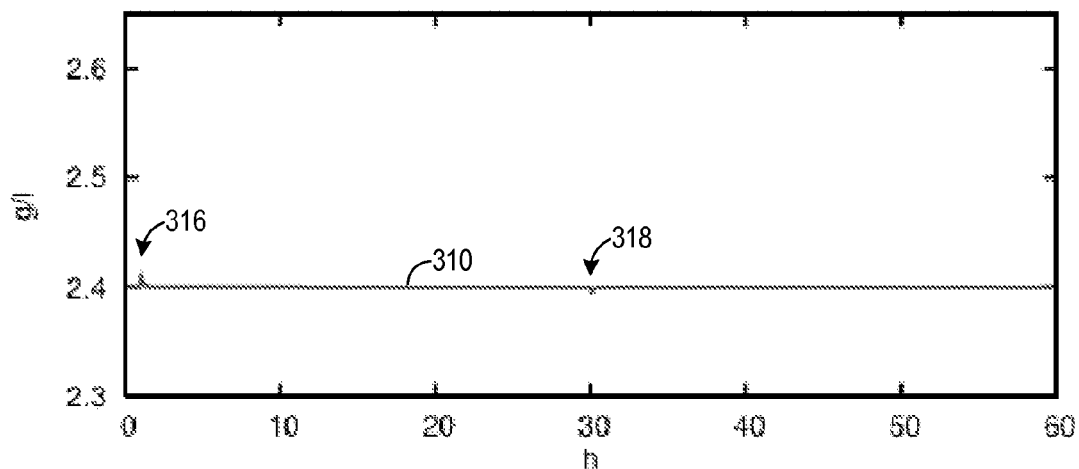
FIG. 8 is a graph showing the response characteristics of a controller in accordance with an embodiment of the present invention to two simulated disturbances in one of the process variables.

FIG. 5 (reproduced from FIG. 9 of Tham) shows the difference in performance between the SMC controller 302 and the PI controller 304. For comparison, FIG. 6 shows the performance of the embodiment of the present invention. As can be seen by comparison of FIG. 6 (showing the performance of controller 310 in accordance with an embodiment of the present invention) to FIG. 5, the controller 310 in accordance with the present invention has a superior response to a series of disturbances 312 and 314 in the feed concentration. Similarly, FIGS. 7 and 8 show the controller 302, 304, and 310 responses to disturbances 316 and 318 in the maximum specific growth rate of the continuous fermentation reactor. Once again, the controller 310 of the current embodiment was able to adapt instantly with comparatively little lag, overshoot, or oscillation during the simulation to yet another type of disturbance.

As FIGS. 3-8 illustrate, Tham's SMC controller 302 (known principally for its robust control), although very complex, is a clear improvement over the conventional PI controller 304. However, the comparatively simpler controller 310 of the current embodiment is an even further improvement. Furthermore, the controller 310 is so simple to tune that it can be deployed and maintained at very low cost. Yet, the controller 310 outperforms even advanced methods such as the Tham SMC controller.

EXAMPLE 2

20-Tray Binary Distillation Column

Figure 9:
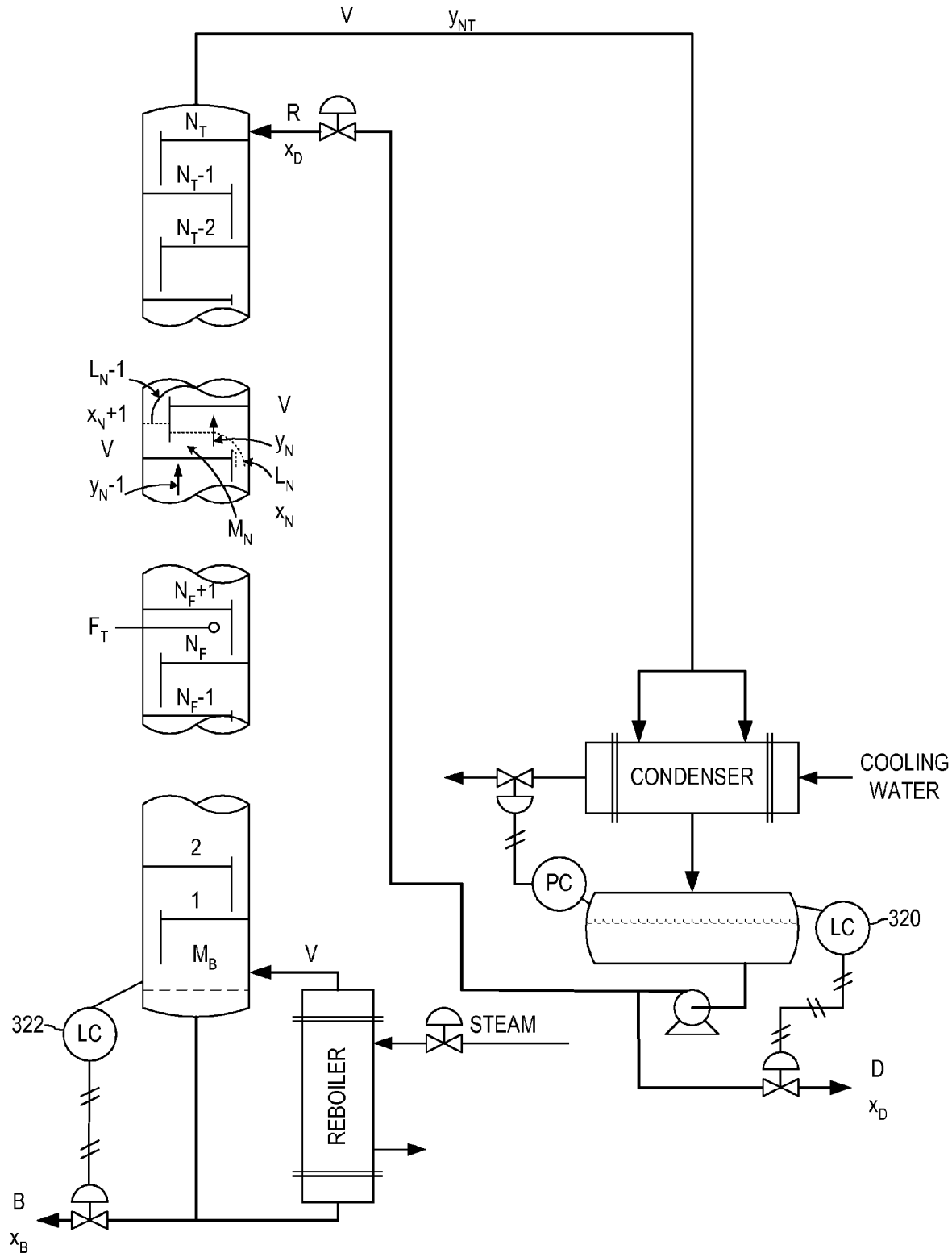
FIG. 9 depicts a piping and instrument diagram for a 20-tray binary distillation column, denoting process variables.
Figure 10:
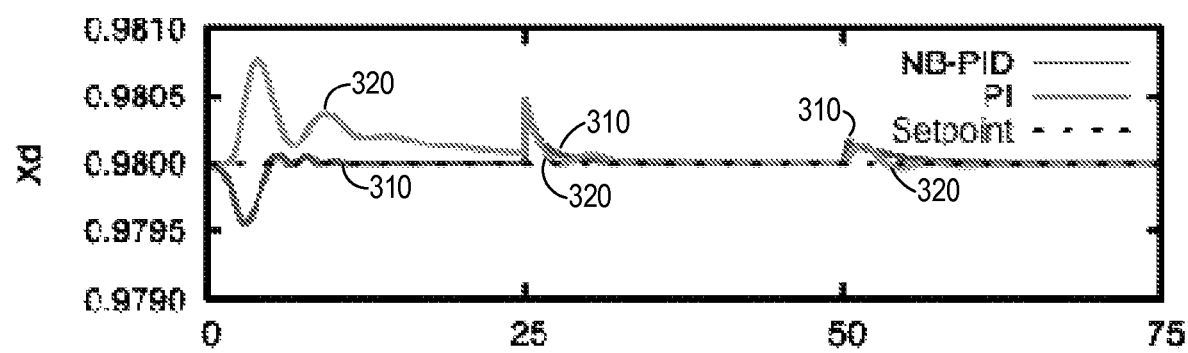
FIGS. 10 and 11 show the response of a controller in accordance with the present invention compared to a PI controller in response to a simulated process disturbances.
Figure 11:
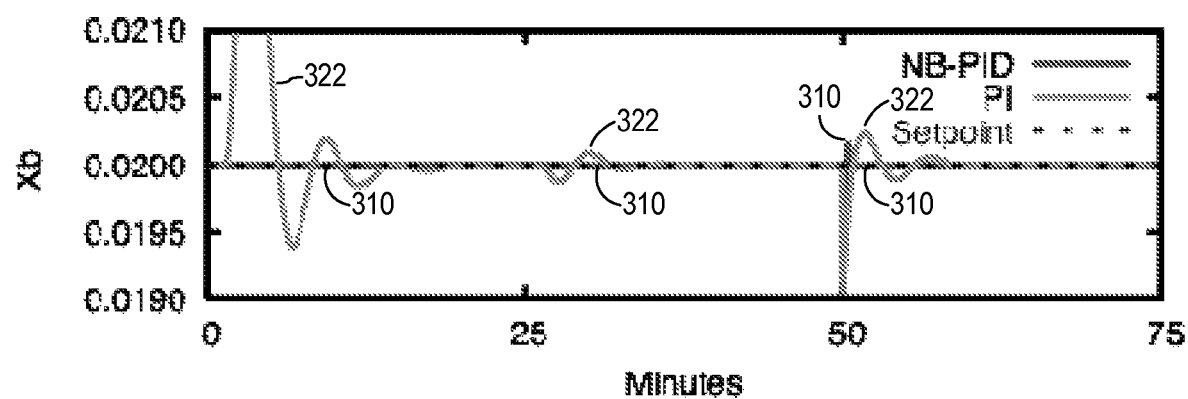

With reference now to FIGS. 9-11, a simulation was also performed for a 20-tray binary distillation column. A mathematical model of the two-input two-output 20-tray binary distillation column of FIG. 9, as described by W. L. Luyben, is used, which model also provides two specially-tuned PI controllers 320 and 322 for the column, is used for comparison. See, Luyben, W. L. *Process Modeling, Simulation, and Control for Chemical Engineers,* 2nd edition, N.Y., McGraw-Hill, 1990. This system is complex, with over 80 dynamic equations, which render the two controlled variables highly interactive.

Below are the system equations for the binary distillation column, with tray number $n \in \{1,2, \ldots Nt=20\}$, and the following variable definitions.

$x_B$: liquid composition in the column base (controlled variable)
$x_D$: liquid composition in the reflux drum (controlled variable)
$x_n$: liquid composition in the nth tray
$y_n$: vapor composition in the nth tray
$L_n$: liquid flow leaving the nth tray
$M_n$: liquid holdup of the nth tray
F: feed rate
z: feed composition
R: reflux flowrate (manipulated variable)
V: vapor boilup (manipulated variable)

The system equations for the top tray are as follows:

$$\frac{dM_{Nt}}{dt} = R - L_{Nt}$$

$$\frac{d(M_{Nt} x_{Nt})}{dt} = R x_D - L_{Nt} x_{Nt} + V(y_{Nt-1} - y_{Nt})$$

The system equations for the feed tray are as follows:

$$\frac{dM_{Nf}}{dt} = L_{Nf+1} - L_{Nf} + F$$

$$\frac{d(M_{Nf} x_{Nf})}{dt} = L_{Nf+1} x_{Nf+1} - L_{Nf} x_{Nf} + V(y_{Nf-1} - y_{Nf}) + Fz$$

The system equations for the bottom tray are as follows:

$$\frac{dM_1}{dt} = L_2 - L_1$$

-continued $$\frac{d(M_1 x_1)}{dt} = L_2 x_2 - L_1 x_1 + V(y_B - y_1)$$

The system equations for all other trays are as follows:

$$\frac{dM_n}{dt} = L_{n+1} - L_n$$

$$\frac{d(M_n x_n)}{dt} = L_{n+1} x_{n+1} - L_n x_n + V(y_{n-1} - y_n)$$

The system equations for the column base, liquid flows and vapor compositions are as follows:

$$\frac{d(M_B x_B)}{dt} = L_1 x_1 - V y_B - B x_B$$

$$L_n = \overline{L_n} + \frac{M_n - \overline{M_n}}{\beta}$$

$$y_n = \frac{\alpha x_n}{1 + (\alpha - 1) x_n}$$

$$y_B = \frac{\alpha x_B}{1 + (\alpha - 1) x_B}$$

The objective is to hold the overhead composition $x_D$ and the bottoms composition $x_B$ at their respective setpoints while the process undergoes a series of disturbances, including a 10% change in feed composition at 1.25 minutes, a spike in $x_D$ at 25 minutes, and a drop in $x_B$ at 50 minutes. Both the controllers 310 of the present invention, and conventional PI controllers, reactions to the disturbances in $x_D$ and $x_B$ illustrate the strong dynamic interactions between the controlled variables.

In this case, an embodiment of the present invention was simulated, using a pair of controllers 310. Controllers 310 were tuned in just a few simple rounds by trial-and-error by varying the single scaling factor K, the resulting control again outperforming conventional PIs in controlling this difficult application.

More specifically, and as described by Luyben, the system has two inputs and two outputs. One controller 320 manipulates the reflux flowrate to control the overhead composition and another controller 322 manipulates the vapor boilup to control the bottoms composition. FIG. 9 illustrates a schematic of the system (as reproduced from figure 3.12 of Luyben). Due to the complexity of the system, tuning the controllers must have been a significant undertaking for Luyben, involving complex tools such as log modulus criteria and frequency response plots in the complex numbers plane. Thus, a simpler approach is called for.

Advantageously, the controllers 310 of the current embodiment provide a much simpler approach. During the simulation, each of the two controllers 310 was tuned with a few rounds of trial and error variations of its own gain K. This process took about 2 minutes. Yet, as FIGS. 10 and 11 illustrate, the controllers 310 of the current embodiment perform much better than the specialized conventional controllers 320 and 322.

These results are typical. In case after case the present inventors have found it extremely easy to tune the controllers in accordance with embodiments of the present invention to many different single and multivariable systems. In each case, the control systems in accordance with the present invention have proven extraordinarily robust.

EXAMPLE 3

Forced Circulation Evaporator

Figure 12:
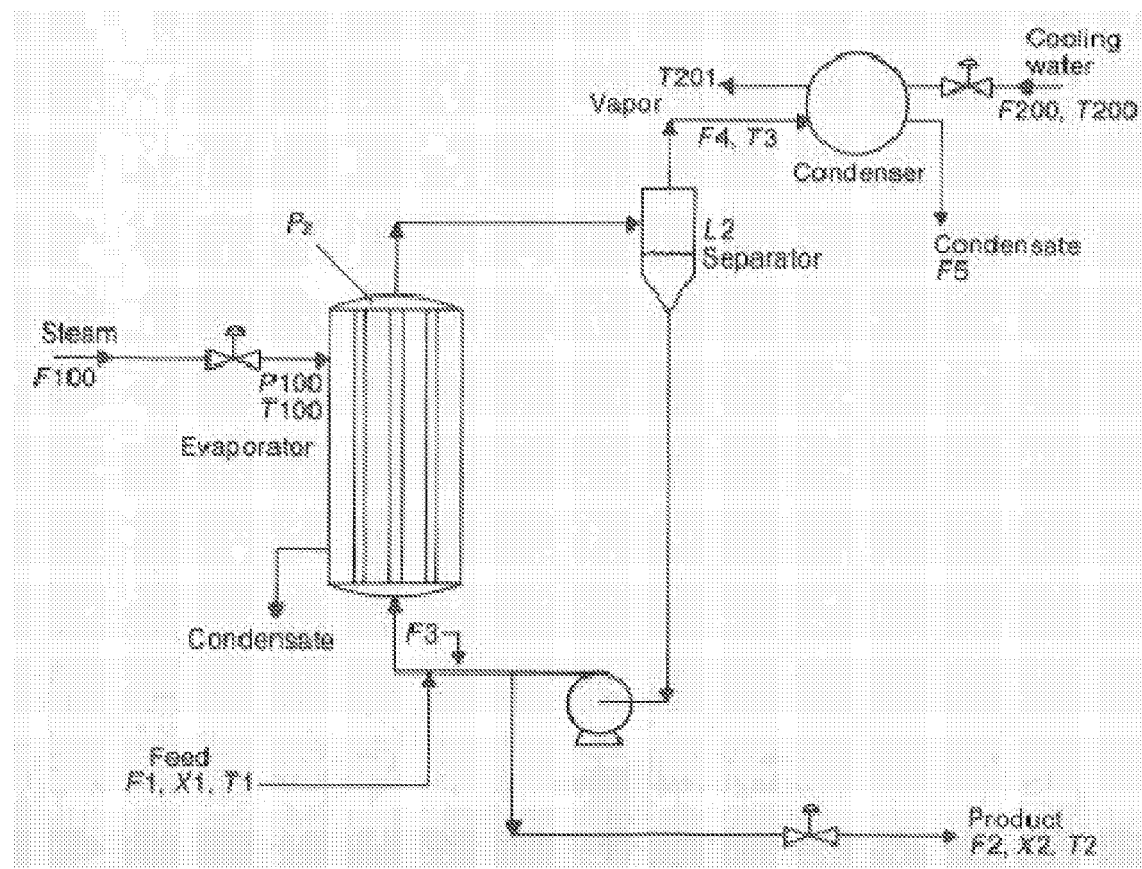
FIG. 12 shows a piping and instrument diagram of a forced circulation evaporator process, denoting process variables.

In this example, depicted in FIGS. 12 to 14, a complex and difficult evaporation process described by Newell and Lee (See, R. B. Newell & P. L. Lee, *Applied Process Control: A Case Study*, Prentice Hall, New York, 1989) that has become a common benchmark used by engineers to compare different control methods has been simulated.

The system consists of a condenser, a separator, and an evaporator, and has three inputs (product composition, operating tank pressure, and separator fluid level; X2, P2, and L2, respectively) and three outputs (steam pressure, cooling water flowrate, and product flowrate; P100, F200, and F2, respectively). The process is nonlinear, unstable, and, as can be seen from the system equations given below has non-obvious input-output pairings.

FIG. 12 shows a schematic of the forced circulation evaporator process, which is a figure reproduced from FIG. 2.1 of Newell and Lee. See, R. B. Newell & P. L. Lee, *Applied Process Control: A Case Study*, Prentice Hall, New York, 1989.

Below are the variable definitions and system equations for the forced circulation evaporator process.

F1: feed flowrate
F2: product flowrate (manipulated variable)
F3: circulating flowrate
F4: vapor flowrate
F5: condensate flowrate
X1: feed composition
X2: product composition (controlled variable)
T1: feed temperature
T2: product temperature
T3: vapor temperature
L2: separator level (controlled variable)
P2: operating pressure (controlled variable)
F100: steam flowrate
T100: steam temperature
P100: steam pressure (manipulated variable)
Q100: heater duty
F200: cooling water flowrate (manipulated variable)
T200: cooling water inlet temperature
M: liquid mass
Q200: condenser duty
C: conversion constant
$\rho$: liquid density
A: cross-sectional area of the separator
$C_p$: liquid heat capacity
$\lambda$: latent heat of vaporation
UA1: heat transfer coef. times heat transfer area
UA2: heat transfer coef. times heat transfer area The system equations for the forced circulation evaporator used in the simulation are:

$$\frac{dX2}{dt} = \frac{F1X1 - F2X2}{M}$$

$$\frac{dP2}{dt} = \frac{F4 - F5}{C}$$

$$\frac{dL2}{dt} = \frac{F1 - F4 - F2}{\rho A}$$

-continued $$F4 = \frac{Q100 - F1C_p(T2 - T1)}{\lambda}$$

$$F5 = \frac{Q200}{\lambda}$$

$$Q100 = UA1(T100 - T2)$$

$$Q200 = \frac{UA2(T3 - T200)}{1 + UA2/(2C_pF200)}$$

$T2 = 0.5616P2 + 0.3126X2 + 48.43$ $T3 = 0.507P2 + 55.0$ $T100 = 0.1538P100 + 90.0$ $UA1 = 0.16(F1 + F3)$

Source for system equations: R. B. Newell & P. L. Lee, *Applied Process Control: A Case Study*, Prentice Hall, New York, 1989.

Because of this system's complexity, it has only ever been successfully controlled using relatively advanced methods. PID controllers, as will be seen below, perform very poorly.

FIGS. 13A, 13B and 13C, respectively, show the performance of the inventive controller on each of the three controlled variables, X2, P2 and L2, which are plotted normalized around their respective setpoints. In each case, the present inventors were able to tune the inventive controllers in just a few hours using a simple computer-aided search.

The process undergoes the following disturbances: setpoint changes in X2 at 51, 71, 91, 111, and 131 minutes, and a 25% reduction in the feed flowrate F1 at 151 minutes.

For comparison, the graph of FIG. 14 shows the performance of an ANMC controller (Adaptive Neural Model Control—a type of dynamic neural network that incorporates multistep nonlinear predictive control techniques) on the exact same problem. Note especially the strong reaction to the disturbance in F1 at 151 minutes. (FIG. 14 is reproduced from selectable Fig. 5.11 of Mills et. al.) See, P. M. Mills, A. Y. Zomaya, M. O. Tadé, *Neuro-Adaptive Process Control: A Practical Approach*, Wiley, Chichester, 1996.

It is believed the ANMC's performance was actually better than any controller it had been tested against until the present invention. The following table shows the disturbance rejection performance of several different controllers, again on the same problem. Each cell shows the ITAE measure (Integrated Time-weighted Absolute Error—a measure of the degree of failure to maintain a process at its setpoints; the smaller the better) for each controller and for each controlled variable.

TABLE

| DISTURBANCE REJECTION PERFORMANCE | | | |
|---|---|---|---|
| Controller | X2 | P2 | L2 |
| Present Invention | 0.0004 | 12 | 1 |
| ANMC | 28 | 41 | 8 |
| GMC (full model) | 90 | 207 | 20 |
| GMC | 1070 | 551 | 330 |
| MPC | 6600 | 7900 | 127 |
| PI | 13500 | 7200 | 436 |

ITAE measures for various controllers through 100 minutes following a 25% reduction in F1. Data for controllers other than the inventive controllers is from Newell and Lee and Mills et. al. See, P. M. Mills, A. Y. Zomaya, M. O. Tadé, *Neuro-Adaptive Process Control: A Practical Approach*, Wiley, Chichester, 1996.

As can be seen from the foregoing Table, the inventive controllers are clearly the most robust of all the different controllers. Worst are the PIs (whose performance is actually even worse than it looks, in that they failed completely at the 25% disturbance, so the results shown here are for a disturbance of only 15%).

The remaining controller types are Generic Model Control (GMC) (the full model of which has access to several process measurements, including the load disturbance on F1, unavailable to the other controllers), and Model Predictive Control. Both of these methods are considered advanced.

These results show that the inventive controllers deliver truly outstanding control performance, while at the same time being by far the most simple, quick, and low cost solution available.

EXAMPLE 4

First-Order Plus Dead-Time

A (first-order plus dead-time)FOPDT process has the following transfer function.

$$G_S = \frac{1}{s+1} e^{-0.5s}$$

FIG. 15 shows an inventive controller controlling the FOPDT system with unit change in setpoint at time t=0. As can be seen, the inventive controller closely tracks the setpoint, despite its rapid change.

EXAMPLE 5

Nonlinear Batch Reactor

This example, depicted graphically in FIG. 16, shows the inventive controller's ability to track a moving setpoint. For this example, the following consecutive, irreversible reactions, described by Chen and Huang, are simulated. See, J. Chen, T.-C. Huang, *Applying neural networks to on-line updated PID controllers for nonlinear process control*.

The system equation for the nonlinear batch reaction is:

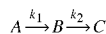

The first reaction has second-order kinetics and the second reaction has first-order kinetics. The system dynamics for the nonlinear batch reactor are as follows.

$$\frac{dC_A}{dt} = -k_1 C_A^2$$

$$\frac{dC_B}{dt} = k_1 C_A^2 - k_2 C_B$$

$$\frac{dT}{dt} = \gamma_1 k_1 C_A^2 + \gamma_2 k_2 C_B + \alpha_1 + \alpha_2 T + (\beta_1 + \beta_2 T) u$$

$$k_1 = A_{10} \exp(-E_1/RT)$$

$$k_2 = A_{20} \exp(-E_2/RT)$$

The objective is to maintain the reaction temperature T at a moving setpoint defined as follows.

The setpoint calculation for the nonlinear batch reactor is performed according to the following formula:

$$T^{SET} = 54 + 71 \exp(-2.5 \times 10^{-3} t)$$

The controller adjusts two split range valves, which allow either steam or cooling water into a jacket that surrounds the reactor, with the manipulated parameter u [0,1]: u=0 represents maximum cooling, and u=1 maximum heating.

FIG. 16 shows the performance of the inventive controller on this nonlinear batch reactor system. As can be seen, the inventive controller quickly raises the temperature to the desired setpoint curve, without substantial overshoot, and then closely tracks the reducing nonlinear setpoint curve.

As demonstrated above, use of the control method described herein is simple and robust, can be easily and rapidly tuned for a particular application, yet performs control in a wide variety of applications better than much more complex systems.

It is understood that the present invention can take many forms and embodiments. Accordingly, several variations may be made in the foregoing without departing from the spirit or the scope of the invention. For example, different sampling periods can be used in the calculations, i.e., values of e other than $e_t$ and $e_{t-1}$, can be used, such as $e_{t-2}$, $e_{t-3}$, etc.; and values of X other than $X_t$ and $X_{t-2}$ can be used such as $X_{t-1}$ and $X_{t-3}$, etc. Also, respective gains of 20, 2 and 2/9 for the "P," "I" and "D" terms of Equation 3, respectively, can be any values that provide satisfactory performance. Likewise, the coefficients to each of the factors in Equations 4 or 5 can be any values that provide satisfactory performance. As discussed above, in one embodiment, only the single parameter "K" need be adjusted during tuning of the controller.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A controller comprising:
an input for a controlled variable;
a proportional term;
an integral term; and
a predictive term having:
an error-predictive subterm that is a function of at least a past value of an error; and
a command-predictive subterm that is a function of at least one past value of a control command value; and
an output, the controller to apply the predictive term and at least one of the proportional term and integral term to generate a command for the output.

2. The controller of claim 1 wherein gains for the proportional term, the integral term and the predictive term have predetermined values and further comprising a user-selectable and singular gain for tuning the controller, the controller being configured to apply the singular gain to one or more terms to tune the controller.

3. The controller of claim 2 wherein values of the gains are set so that the controller is stable.

4. The controller of claim 1 further comprising a separate gain for each of the terms.

5. The controller of claim 4 wherein the gains for the proportional, the integral, and the predictive terms are in the approximate relative proportions of 20, 2, and 2/9 respectively.

6. The controller of claim 1 wherein the command-predictive subterm comprises at least two values of the command at different times.

7. The controller of claim 1 wherein a current value of the error is the "t" value and wherein the error-predictive subterm is based on a t value and a t-1 value of the error.

8. The controller of claim 7 further comprising a gain for the t error value being approximately 9 and a gain for the t-1 error value having the opposite sign as the t error value and having a magnitude of approximately 12.

9. The controller of claim 1 wherein the command-predictive subterm is based on a t value and a t-2 value of the command.

10. The controller of claim 9, wherein a gain for the t command value is approximately double the gain for the t-2 command value and has the opposite sign as the t command value.

11. The controller of claim 1 wherein the controlled variable is selected from the group consisting of a temperature, a pressure, a level, a flow rate, a weight, a position, a velocity, and a concentration.

12. The controller of claim 1 wherein the error-predictive subterm comprises at least two values of the error at different times.

13. A method for controlling a process variable comprising:
   applying a predictive term that comprises an error-predictive subterm that is a function of at least a past value of an error and a command-predictive subterm that is a function of at least a past value of a control command and at least one of a proportional term and an integral term to controlling the controlled process variable; and
   generating a command based on the results of the applying the terms.

14. The method of claim 13 wherein gains for the proportional term, the integral term and the predictive term have predetermined values and further comprising determining a user-selectable and singular gain for tuning the controller, and applying the user-selectable and singular gain to one or more terms to tune the controller.

15. The method of claim 14 wherein values of the gains are set so that the controller is stable.

16. The method of claim 13 further comprising applying a separate gain to each of the terms.

17. The method of claim 16 wherein the gains for the proportional, the integral, and the predictive terms are in the ratio of approximately 20, 2, and 2/9 respectively.

18. The method of claim 13 wherein the command-predictive subterm comprises at least two values of the command at different times.

19. The method of claim 13 wherein a current value of the error is the "t" value and wherein the error-predictive term is based on a t value and a t-1 value of the error.

20. The method of claim 19 further comprising a gain for the t error value being approximately 9 and a gain for the t-1 error value having the opposite sign as the t error value and having a magnitude of approximately 12.

21. The method of claim 13 wherein the command-predictive subterm is based on a t value and a t-2 value of the command.

22. The method of claim 21 further comprising a gain for the t command value being approximately double the gain for the t-2 command value and has the opposite sign as the t command value.

23. The method of claim 13 wherein the controlled variable is selected from the group consisting of a temperature, a pressure, a level, a flow rate, a weight, a position, a velocity, and a concentration.

24. The method of claim 13 wherein the error-predictive subterm comprises at least two values of the error at different times.

25. A computer program product for controlling a system, the computer program product having a medium embodied thereon, the computer program comprising:
   computer code for applying a predictive term that comprises an error-predictive subterm that is a function of at least a past value of an error and a command-predictive subterm that is a function of at least a past value of a command for controlling a controlled variable;
   computer code for applying the predictive term and at least one of the proportional term and the integral term to an error associated with a controlled variable; and
   computer code for generating the control command based on the results of applying the terms that is a function of predictive term and at least one of the proportional term and the integral term.

26. The computer program product of claim 25 wherein gains for the proportional term, the integral term and the predictive term have predetermined values and further comprising a user-selectable and singular gain for tuning the controller, the controller being configured to apply the singular gain to one or more terms to tune the controller.

27. The computer program product of claim 26 wherein values of the gains are set so that the controller is stable.

28. The computer program product of claim 25 further comprising a separate gain for each of the terms.

29. The computer program product of claim 28 wherein the gains for the proportional term, the integral term, and the predictive term are in the approximate relative proportions of 20, 2, and 2/9 respectively.

30. The computer program product of claim 25 wherein the command-predictive subterm further comprises at least two values of the command at different times.

31. The computer program product of claim 25 wherein a current value of the error is the t value and wherein the error-predictive subterm is based on a t value and a t-1 value of the error.

32. The computer program product of claim 31 further comprising a gain for the t error value being approximately 9 and a gain for the t-1 error value having the opposite sign as the t error value and being approximately 12.

33. The computer program product of claim 25 wherein the command-predictive subterm is based on a t value and a t-2 value of the command.

34. The computer program product of claim 33, wherein a gain for the t command value is approximately double the gain for the t-2 command value and has the opposite sign as the t command value.

35. The computer program product of claim 25 wherein the controlled variable is selected from the group consisting of a temperature, a pressure, a level, a flow rate, a weight, a position, a velocity, and a concentration.

36. The computer program product of claim 25 wherein the error-predictive subterm further comprises at least two values of the error at different times.

37. A control loop comprising:
 a system with an associated controlled variable;
 a sensor adapted to sense the controlled variable;
 a controller including:
  an input in communication with the sensor to receive the controlled variable;
  a proportional term;
  an integral term;
  a predictive term having:
   an error-predictive subterm that is a function of at least a past value of an error; and
   a command-predictive subterm that is a function of at least a past value of a control command, and
  an output, the controller to apply the predictive term and at least one of the proportional term and the integral term to generate a command for the output.

38. The control loop of claim 37 wherein gains for the proportional term, the integral term and the predictive term have predetermined values and further comprising a user-selectable and singular gain for tuning the controller, the controller being configured to apply the singular gain to one or more terms to tune the controller.

39. The control loop of claim 38 wherein values of the gains are set so that the controller is stable.

40. The control loop of claim 37 further comprising a separate gain for each of the terms.

41. The control loop of claim 40 wherein the gains for the proportional term, the integral term, and the predictive term are in the approximate relative proportions of 20, 2, and 2/9 respectively.

42. The control loop of claim 37 wherein the command-predictive subterm further comprises at least two values of the command at different times.

43. The control loop of claim 37 wherein a current value of the error is the t value and wherein the error-predictive subterm is based on a t value and a t-1 value of the error.

44. The control loop of claim 43 further comprising a gain for the t error value being approximately 9 and a gain for the t-1 error value having the opposite sign as the t error value and having a magnitude of approximately 12.

45. The control loop of claim 37 wherein the command-predictive subterm is based on a t value and a t-2 value of the command.

46. The control loop of claim 45, wherein a gain for the t command value is approximately 2 times the gain for the t-2 command value and has the opposite sign as the t command value.

47. The control loop of claim 37 wherein the controlled variable is selected from the group consisting of a temperature, a pressure, a level, a flow rate, a weight, a position, a velocity, and a concentration.

48. The control loop of claim 37 wherein the error-predictive subterm further includes at least two values of the error at different times.

* * * * *